United States Patent [19]
Rundell

[11] 3,823,607
[45] July 16, 1974

[54] HEAVY-DUTY TORQUE COUPLING
[75] Inventor: Herbert A. Rundell, Houston, Tex.
[73] Assignee: Texaco, Inc., New York, N.Y.
[22] Filed: Aug. 14, 1972
[21] Appl. No.: 280,638

[52] U.S. Cl.............................. 73/136 A
[51] Int. Cl. ............................ G01l 3/10
[58] Field of Search.................. 73/136 A

[56] References Cited
UNITED STATES PATENTS
3,504,538  4/1970  Andrews et al.............. 73/136 A
3,599,482  8/1971  Rundell........................ 73/136 A
FOREIGN PATENTS OR APPLICATIONS
968,502  9/1964  Great Britain................ 73/136 A
617,064  2/1949  Great Britain................ 73/136 A Primary Examiner—Charles A. Ruehl
Attorney, Agent, or Firm—Thomas H. Whaley; C. G. Ries

[57] ABSTRACT

A heavy-duty coupling unit that incorporates a sensitive torque-measuring device. It has provision for being mounted on the end of a torque-load transmitting shaft, and it has a folded-back structure so as to accommodate a gear or the like for a laterally coupled drive.

6 Claims, 2 Drawing Figures

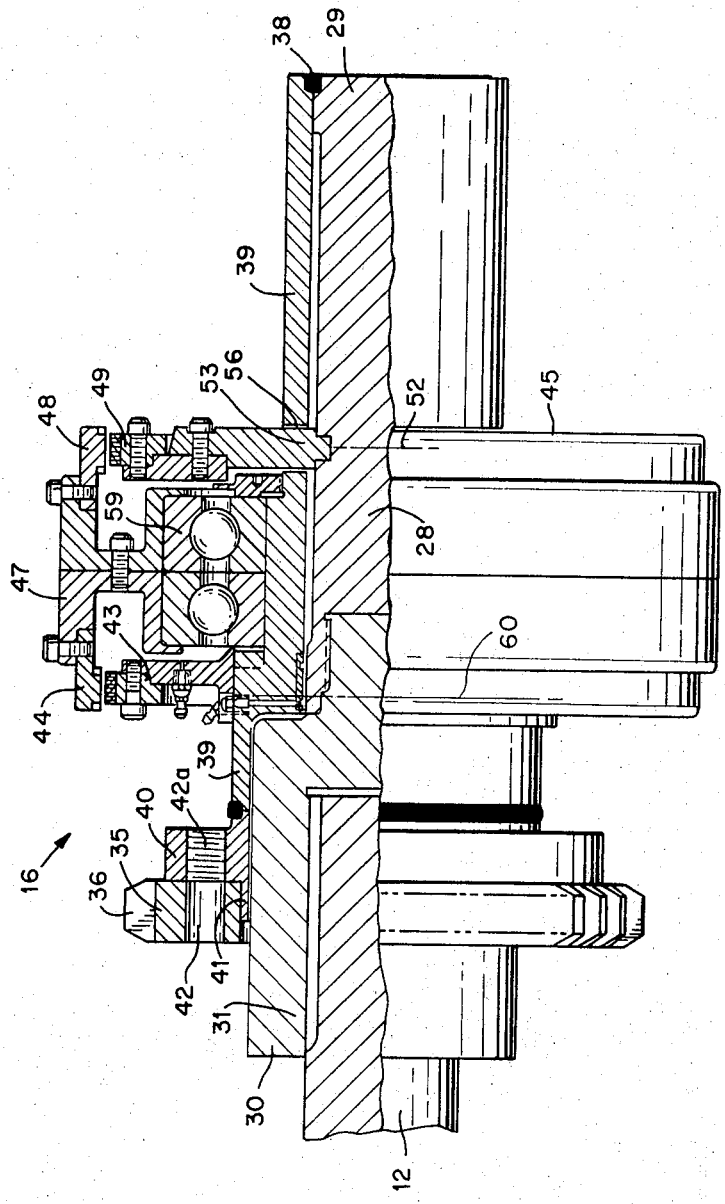
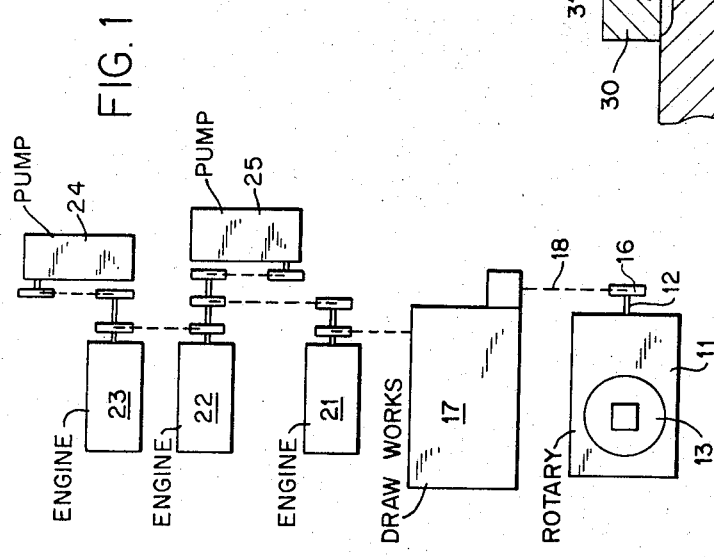

HEAVY-DUTY TORQUE COUPLING

BACKGROUND OF THE INVENTION

1. Field of the Invention

This invention relates to a mechanical coupling structure, in general. In particular, it concerns a torque-shaft unit with related structural elements that is used for transferring torque-applied energy, laterally with respect to the axis of the torque shaft.

2. Description of the Prior Art

In connection with oil-well drilling and similar activities, it has been found that a heavy-duty and yet sensitive dynamic torque meter has great potential value. While such a torque meter has been proposed and is described in my earlier U.S. Pat. No. 3,295,367, issued Jan. 3, 1967, it has the drawback of being only adaptable for longitudinal or axially-oriented connection in a drive-shaft coupling. Although that drawback was overcome by my U.S. Pat. No. 3,599,482, issued Aug. 17, 1971, there still existed the drawback of requiring two separate chain driving connections even though both gears are located close together. Consequently, it is an object of this invention to provide an improved mechanical coupling arrangement that is adaptable for mounting directly on a shaft which includes a gear for lateral drive coupling while providing a compact unitary structure for the torque measurement.

Another object of the invention is to provide a torque-measuring coupling unit that is adapted for direct mounting on the drive shaft of a drilling rig rotary, so as to permit direct lateral drive coupling using a chain drive, or the like.

SUMMARY OF THE INVENTION

Briefly, this invention concerns a heavy-duty dynamic torque-measuring coupling unit for interconnecting a torque-load-transmitting shaft with a lateral drive. It comprises in combination a shaft for transmitting said high torque from said lateral drive, and first means for dynamically measuring the amount of relative angular displacement at two locations spaced axially apart a substantial distance along the said shaft. It also comprises second means integrally attached to said shaft for coupling said lateral drive.

Again briefly, it concerns a heavy-duty dynamic torque-measuring coupling unit that is especially adapted for interconnecting a well drilling rotary with a chain drive power supply. The said rotary has a drive shaft with a splined free end. The coupling unit comprises in combination a torque shaft which has an internally grooved socket at one end for mounting the unit on said splined free end of the rotary drive shaft. It also comprises a dynamic torque meter mounted on said torque shaft for measuring the amount of relative angular displacement at the other end from said socket and at a location spaced axially back a substantial distance from said other end. The torque meter also has a pair of rotors and a pair of stators. The said dynamic torque meter comprises a heavy-duty sleeve integrally attached to said torque shaft at said other end from the socket. The sleeve has one of said rotors attached thereto for maintaining said one rotor and said end at the same relative angular position under all load conditions. The torque meter also comprises radial spokes that are integrally attached to said torque shaft at said axially spaced location. The spokes have the other of said rotors attached thereto for maintaining said other rotor and said location of the shaft at the same relative angular position at all times. The said sleeve has circumferentially extending slots therein to permit said spokes to pass through with enough clearance to permit the maximum twist under full load without contacting said spokes. The torque meter also comprises a unitary housing for supporting said pair of stators. The said housing is supported on ball bearings that are mounted on said sleeve.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein FIG. 1 is a schematic plan view of the layout of a rotary drilling operation; and FIG. 2 is an enlarged side elevation partly broken away in cross-section, illustrating a coupling unit for torque measurement, according to the invention.

DESCRIPTION OF THE PREFERRED EMBODIMENT

With reference to FIG. 1, it will be observed that there is schematically indicated by a plan view, various conventional elements employed in rotary drilling. Thus, there is shown a rotary unit 11 that has an input shaft 12 for driving a rotary table 13 in the conventional manner. Shaft 12 has attached to the end thereof a dynamic torque-measuring coupling unit 16 according to the invention. It permits lateral drive force to be coupled from a draw works 17 that is conventional and has the output drive therefrom coupled by any conventional structure, e.g., a chain-drive element, as schematically indicated by a dashed line 18.

It will be understood that the driving power for operating the draw works 17 may be produced in any conventional manner such as by use of a plurality of engines 21, 22, and 23. There may also be auxiliary elements for use in the drilling operation, e.g., a pair of pumps 24 and 25, as illustrated.

FIG. 2 illustrates the details of a torque-coupling unit according to the invention. It was schematically shown in FIG. 1 as the unit 16. It will be understood that this unit may be attached to the end of the shaft 12 in any feasible manner to insure positive rotation without any looseness. For example, this is preferably done by means of a splined joint at the end of the shaft 12, as indicated.

The unit 16 comprises a central shaft 28 that has a free end 29 opposite to an attachment end 30. The end 30 has a socket 31 therein. On the inside diameter of socket 31 are conventional type grooves to match with the above-indicated splines (not shown) on the ends of shaft 12.

The coupling unit 16 also has a gear 35 with teeth 36 thereon to receive a chain (not shown) for providing the lateral driving force, as indicated above. The gear 35 is integrally attached to the inner end of a heavy-duty sleeve 39 that surrounds the shaft 28 and has its other end connected integrally in a positive manner to the end 29 of the shaft 28.

The integral connection of sleeve 39 to end 29 may, of course, be made in any feasible manner. However, preferably, the connection is secured by welding, as indicated by a weld 38 illustrated in the drawing.

There is a hub 40 to which the gear 35 is attached. The hub 40 has a notched edge 41 for receiving the gear, and the gear will be bolted onto the hub 40 by bolts (not shown) that would go through a plurality of holes 42 in the gear 35 and be threaded into corresponding threaded holes 42 in the hub 40. The hub 40 is integrally fastened onto the sleeve 39 by welding as indicated in the drawing.

It will be noted that the sleeve 39 is of sufficient thickness to carry the heavy-duty torque load involved with a moderate angular displacement, i.e., twisting of the sleeve from one end to the other. It will be noted that under the heavy duty torque load involved, shaft 28 also has a moderate angular displacement between free end 29 and location 52, as will hereinafter be further described. Preferably, for a given torque load, the angular displacement in sleeve 39 is about equal to the angular displacement in shaft 28.

The coupling unit 16 has associated therewith a dynamic torque meter 45. It is basically like that shown and described in both my above-mentioned U.S. Pats. Nos. 3,295,367 and 3,599,482. However, the structure is more compact because the two A.C. generators are located within a common housing instead of being separated by the torque-shaft distance.

The electrical aspects of the torque meter are identical with the meter described and claimed in my Pat. No. 3,295,367 and need not be repeated here. In this invention one of the A.C. generators has a rotor 43 that is securely fastened onto the sleeve 39 for rotation therewith at all times, and there is a stator element 44 that cooperates electrically with the rotor 43 to produce an A.C. signal, as fully explained in my two earlier U.S. patents indicated above.

There is a unitary housing element 47 that carries the stator 44 thereon, as clearly indicated in the drawing. Also, the housing 47 has a similar stator 48 at the other side thereof from stator 44. The stator 48 acts in cooperation with another rotor 49 to produce another A.C. signal.

As indicated above, these A.C. generators provide the basis of measuring torque by reason of phase difference between the A.C. signals generated by the two A.C. generators. Again, this aspect of the torque measurement has been clearly explained in my prior patents, and no further explanation is required.

It will be observed that the angular position of the rotor 43 is maintained identical with the angular position of sleeve 39 at location 60. This is done by rigidly connecting rotor 43 to sleeve 39 at location 60. On the other hand, the angular position of the other rotor 49 is maintained identical with the angular position of the shaft 28 at a location 52 on the shaft 28. Location 52 is spaced axially a substantial distance from the end 29 of the shaft 28 in order to permit the torque load for measurement to cause physical twisting of the sleeve 39 and shaft 28 between these two locations.

The rotor 49 is securely attached to the shaft 28 at the location 52 by having radial attaching means, or spokes 53. These spokes support the rotor 49 by extending radially through the sleeve 39 in a corresponding plurality of slots 56. Although not directly illustrated, it will be appreciated that these slots 56 extend circumferentially so as to provide clearance for the radial means, or spokes 53. Such clearance must be sufficient to permit maximum twisting or angular displacement between shaft 28 and sleeve 39. The sum of twisting or angular displacement of sleeve 39 from location 60 to free end 29 and angular displacement of shaft 28 from free end 29 to location 52 is a measure of the torque applied to the coupling unit 16 and, as indicated above, the amplitude of such displacement is directly reflected in the phase difference between the A.C. signals which are created in each of the rotor-stator elements 43-44, and 49-48, respectively.

It may be noted that the housing 47 which supports the stators 48 and 44, is mounted for free rotation relative to the shaft 28 and sleeve 39. This is accomplished by employing a low-friction ball bearing 59. Of course, in operation it will be the housing 47 that remains stationary while the sleeve 39 and shaft 28 are rotated therein.

It will be noted that the coupling unit according to this invention provides a compact yet readily adaptable structure for employing a dynamic torque-measuring unit directly on a conventional drive shaft such as the input shaft to the rotary for an oil-well drilling rig. It will be appreciated that this compact structural arrangement makes practical in almost any rotary drilling hook-up the use of a torque-measuring unit which has adequate sensitivity to provide many benefits not heretofore available. The advantages over either or both of my above-mentioned patents will be clear upon noting the structural differences and observing the manner in which a unit according to this invention may be mounted.

While a preferred embodiment of the invention has been set forth above in considerable detail and in accordance with the applicable statutues, this is not in any way to be taken as limiting the invention but merely as being descriptive thereof.

I claim:

1. A heavy-duty dynamic high-torque-measuring coupling unit for interconnecting a torque-load-transmitting first shaft with a lateral drive, comprising in combination a second shaft attached at one end to said first shaft for transmitting said torque load, a co-axially disposed sleeve encompassing said second shaft and being attached at one end to the other end of said second shaft, first means for dynamically measuring the amount of relative angular displacement at two locations on said coupling unit, and gear means rigidly attached to said sleeve adjacent to the other end thereof for coupling said lateral drive, a first of said two locations being upon said sleeve between said gear means and said other end of said second shaft, and the second of said two locations being upon said second shaft inwardly from said other end.

2. A unit according to claim 1, wherein said first means comprises a dynamic torque meter having a pair of rotors and stators, means for attaching a first rotor to said sleeve at said first location, menas for attaching a second rotor to said second shaft at said second location, and unitary housing means for supporting said stators.

3. A unit according to claim 2, wherein said first rotor is maintained at the same relative angular displacement as the first location upon said sleeve, and wherein said second rotor-attaching means comprises radial means for attaching said second rotor to said second shaft such that said second rotor is maintained at the same relative angular displacement as said second shaft at said second location.

4. A unit according to claim 3, wherein said sleeve has circumferential slot means to permit relative angular movement between said radial attaching means and said sleeve.

5. A unit according to claim 4, wherein said unitary housing means includes a low-friction bearing for permitting free rotation of said sleeve and second shaft relative to said unitary housing.

6. A heavy-duty dynamic torque-measuring coupling unit for interconnecting a well drilling rotary unit with a chain-drive power supply, said rotary unit having a drive shaft with a splined free end; said torque-measuring coupling unit comprising in combination:

a torque shaft having an internally grooved socket at one end for mounting on said splined free end of the rotary drive shaft, and a free end;

a sleeve axially encompassing a portion of said torque shaft and attached to said free end a dynamic torque meter mounted to measure the amount of relative angular displacement of said sleeve and said shaft at two locations spaced axially between said socketed shaft end and said free shaft end, having a pair of rotors and stators, wherein a first rotor is attached to a first location upon said sleeve for maintaining said first rotor and said sleeve location at the same relative angular position under all load conditions, radial spokes integrally attached to said torque shaft at an axially spaced location inward from said shaft free end and having the second rotor attached thereto for maintaining said second rotor and said shaft location at the same relative angular position at all times, said sleeve having circumferentially extending slots therein to permit said spokes to pass through with enough clearance to permit the maximum twist under full load without contacting said spokes, and a unitary housing for supporting said pair of stators, said housing being supported on ball bearings mounted upon said sleeve.

* * * * *